(12) United States Patent
Marianetti et al.

(10) Patent No.: US 6,539,476 B1
(45) Date of Patent: Mar. 25, 2003

(54) MOBILE COMPUTER SYSTEM CAPABLE FOR COPYING SET-UP APPLICATION INCLUDING REMOVAL ROUTINE FROM PERIPHERAL DEVICE FOR REMOVING DEVICE PROGRAMS AFTER THE DEVICE IS REMOVED

(75) Inventors: Ron Marianetti, Morgan Hill, CA (US); Jeffrey C. Hawkins, Redwood City, CA (US)

(73) Assignee: Handspring, Inc., Mountain View, CA (US)

( * ) Notice: Subject to any disclaimer, the term of this patent is extended or adjusted under 35 U.S.C. 154(b) by 0 days.

(21) Appl. No.: 09/374,056

(22) Filed: Aug. 12, 1999

(51) Int. Cl.⁷ .................................................. G06F 9/00
(52) U.S. Cl. ............................ 713/100; 710/10; 710/62
(58) Field of Search ................. 710/8, 10, 62, 710/101, 102, 103; 711/100–125; 713/100

(56) References Cited

U.S. PATENT DOCUMENTS

| | | | | |
|---|---|---|---|---|
| 5,386,567 A | * | 1/1995 | Lien et al. .................. | 713/100 |
| 5,689,732 A | * | 11/1997 | Kondo ......................... | 710/64 |
| 5,781,798 A | * | 7/1998 | Beatty et al. ................. | 710/10 |
| 5,915,106 A | * | 6/1999 | Ard .............................. | 703/23 |
| 5,974,473 A | * | 10/1999 | Leavitt et al. ................. | 710/8 |
| 6,009,480 A | * | 12/1999 | Pleso ............................ | 710/8 |

FOREIGN PATENT DOCUMENTS

EP        0718776 A2  *  6/1996

OTHER PUBLICATIONS

Nintendo of America (1996) Compact Video Game System.
PCMCIA Standards (1992) Personal Computer Memory Card International Association.

* cited by examiner

*Primary Examiner*—Thomas Lee
*Assistant Examiner*—Thuan Du
(74) *Attorney, Agent, or Firm*—Dag Johansen; Stattler, Johansen & Adeli LLP

(57) ABSTRACT

A robust external interface for a computer system is disclosed. The robust external interface allows a user to insert or remove external peripherals to the external interface at any time such that the user does not need to carefully follow any scripted procedures. The external interface software detects insertions or removals and acts in an appropriate manner.

42 Claims, 13 Drawing Sheets

MOBILE COMPUTER SYSTEM CAPABLE FOR COPYING SET-UP APPLICATION INCLUDING REMOVAL ROUTINE FROM PERIPHERAL DEVICE FOR REMOVING DEVICE PROGRAMS AFTER THE DEVICE IS REMOVED

FIELD OF THE INVENTION

The present invention relates to the field of mobile computer systems. In particular the present invention discloses a computer system having an external physical interface and robust computer software that allows peripherals to be coupled to and decoupled from the physical interface while the computer system is operating.

BACKGROUND OF THE INVENTION

Mobile computer systems have become a very popular form of computing device. Mobile computer systems allow users to access large amounts of personal information such as an address book, a personal calendar, and a list of to-dos. In particular, the Palm® series of palm-sized computer systems from Palm Computing, Inc of Santa Clara, Calif. have become the de facto standard of handheld computer systems.

To provide additional functionality, it is desirable to include an external hardware interface on the mobile computer system. The Palm® series of palm-sized computer systems includes an external serial interface for communicating with external peripherals. However, an external serial interface is limited due to the limited communication bandwidth and limited interface features.

It would therefore be desirable to provide a higher bandwidth and more feature laden external interface. Ideally, the external interface should be very simple to use such that the user does not need any training. Furthermore, the external Interface should be robust enough to handle any type of user behavior whether appropriate or not.

SUMMARY OF THE INVENTION

The present invention introduces a robust external interface for a computer system. The external interface allows a user to insert or remove external peripherals to the external interface at any time such that the user does not need to carefully follow any scripted procedures. The external interface software detects insertions or removals and acts in an appropriate manner.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which.

DETAILED DESCRIPTION OF THE PREFERRED EMBODIMENT

A method and apparatus for implementing a robust external interface for a computer system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer system. However, the same techniques can easily be applied to any other type of computer system.

Extensible Mobile Computer System

Figure 1A:
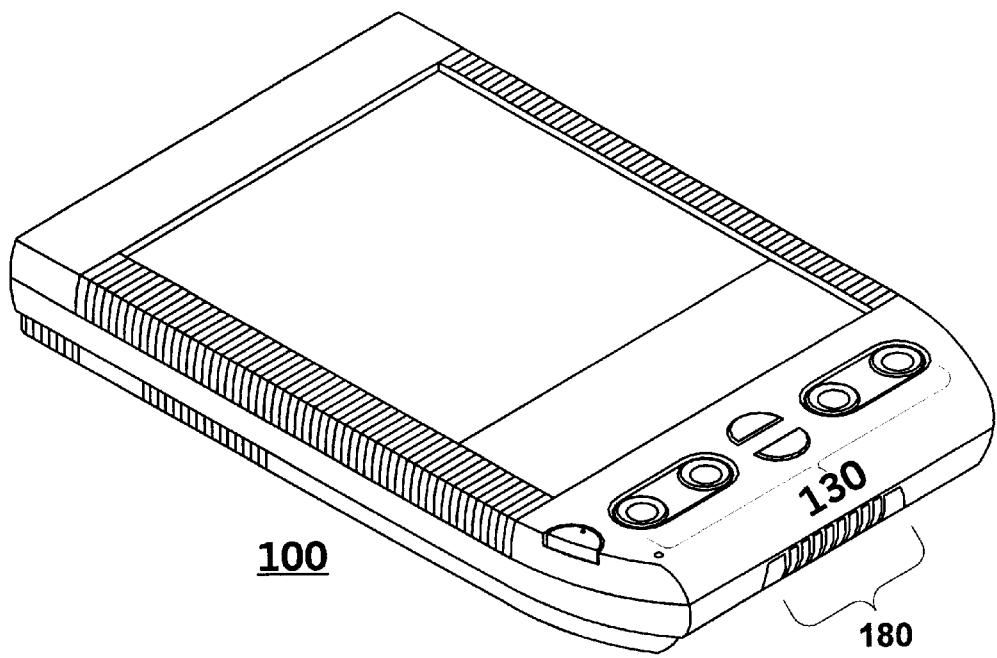
FIGS. 1A and 1B illustrate a mobile computer system with an external peripheral interface.
Figure 1B:
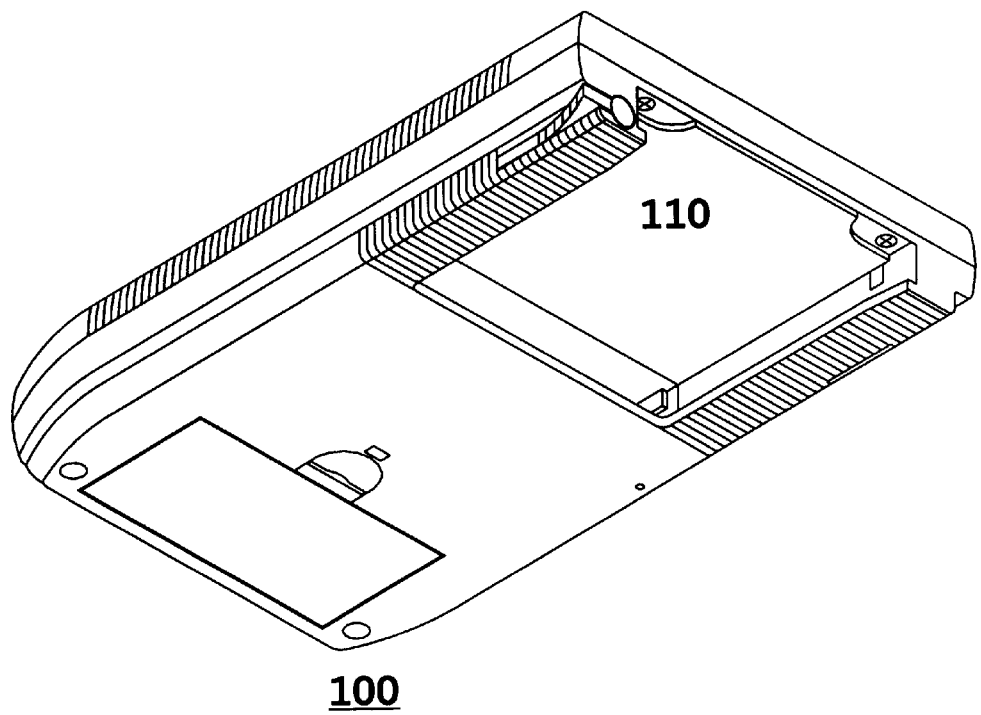

FIGS. 1A and 1B illustrate a mobile computer system 100 that includes an expansion interface 110. The expansion interface allows peripheral devices to be inserted and coupled directly to a bus of the mobile computer system 100. In one embodiment, an interrupt line from the processor in the mobile computer system 100 is coupled to the expansion interface 110 such that the processor can detect when a peripheral device is inserted or removed. A second interrupt line is provided as a signal on the expansion interface 110 such that a peripheral inserted into the expansion interface may obtain the attention of the processor.

Figure 1C:
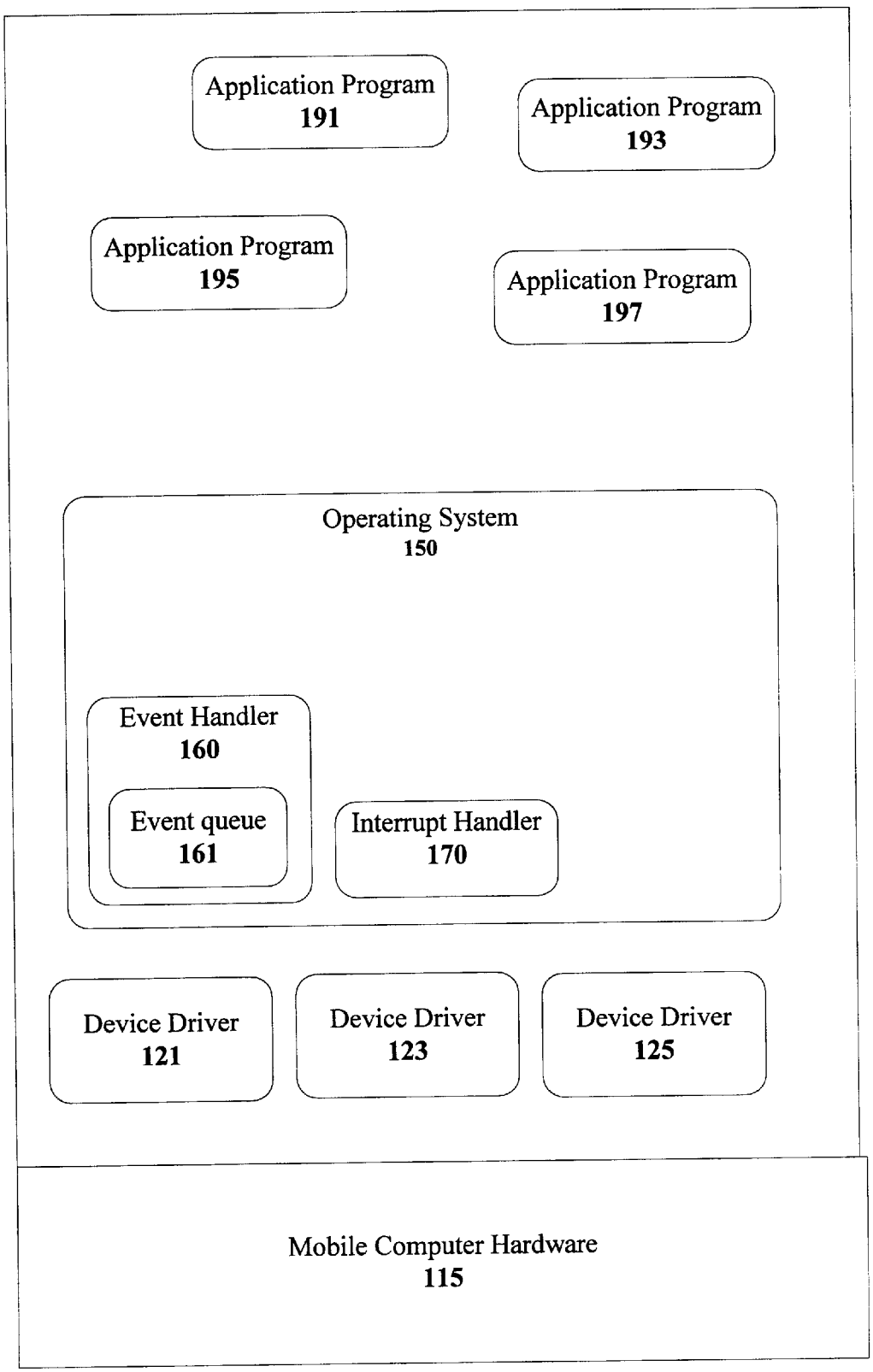
FIG. 1C illustrates a block diagram of one possible software architecture for a mobile computer system.

FIG. 1c illustrates one possible embodiment for a software architecture of the mobile computer system 100. As illustrated in FIG. 1C, several device drivers 121, 123, and 125 are used to control the hardware 115 of the mobile computer system 100. The device drivers are accessed by an operating system 150. The operating system includes an event handler 160 that processes a series of events placed in an event queue 161. The events may comprise interface events such as stylus strokes on a digitizer pad, button presses, menu selections, etc. The operating system also has at least one interrupt handler 170 for handling processor interrupts. Additional interrupts may be introduced at any time. The application programs that run on the mobile computer system 100 use the services of the operating system 150 to interact with the hardware.

Insertion/Removal Overview

To simplify the operation of the mobile computer system 100, the expansion interface 110 has been designed to be simple to operate and very robust. Specifically, the expansion interface 110 has been designed to allow users to insert or remove peripherals at any time. When a user does insert a peripheral into the expansion interface 110 or remove a peripheral from the expansion interface 110, the mobile computer system 100 automatically responds with an appropriate reaction. When a user inserts a peripheral into the expansion interface 110, the mobile computer system 100 first detects the inserted peripheral. Next, the mobile computer system 100 installs any appropriate device driver programs. Finally, the mobile computer system 100 and runs a designated application associated with the peripheral (if there is a designated application). When a user removes a peripheral from the expansion interface 110, the mobile computer system 100 automatically removes any associated device driver programs and terminates any applications that require the removed peripheral.

Peripheral Insertion Overview

Figure 2:
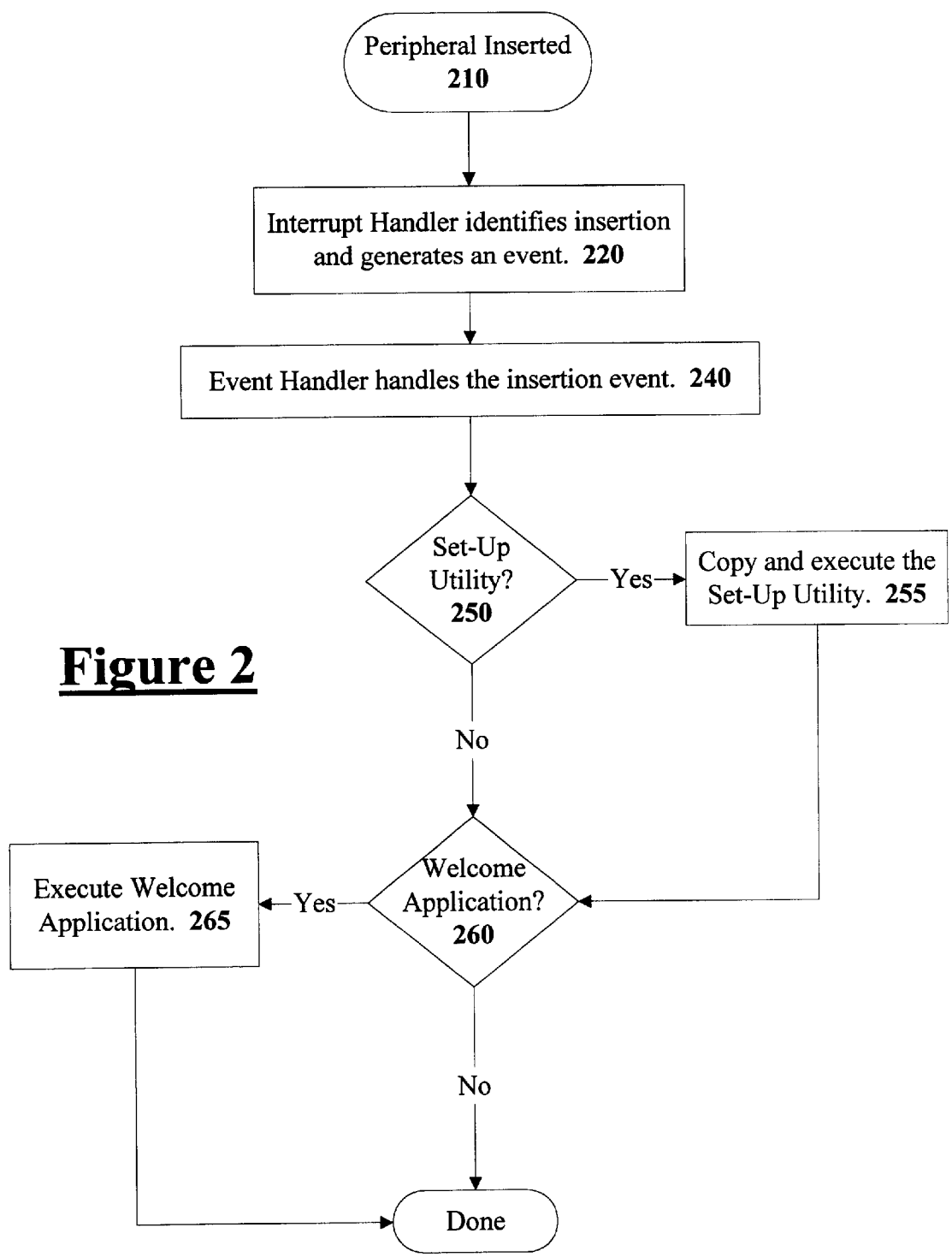
FIG. 2 illustrates a flow diagram of the operations performed when a peripheral device is inserted into an expansion interface.

FIG. 2 illustrates an overview of how the mobile computer system 100 handles peripheral insertions. As illustrated in FIG. 2, a peripheral is inserted into the peripheral expansion interface at step 210. An interrupt handler identifies the insertion of peripheral into the peripheral expansion interface and then queues a peripheral insertion event onto an event queue at step 220.

At step 240, an event handler detects the peripheral insertion event and executes a peripheral insertion routine. At step 250, the peripheral insertion routine attempts to locate a designated set-up utility in the memory space on the peripheral device. If a designated set-up utility is located, the peripheral insertion routine copies the designated set-up utility from the peripheral device memory into the main memory of the mobile computer system. The peripheral insertion routine then executes the set-up utility at step 255.

After executing the set-up utility (if there was one), the peripheral insertion event handler routine attempts to locate a designated "welcome application" in the memory space on the peripheral device at step 260. If a designated welcome application is located, the peripheral insertion routine launches the welcome application at step 265. At this point, the peripheral is initialized and any default application associated with the inserted peripheral is now executing. Thus, the insertion of the peripheral caused the mobile computer system to prepare itself for the use of the inserted peripheral.

Peripheral Removal Overview

Figure 3:
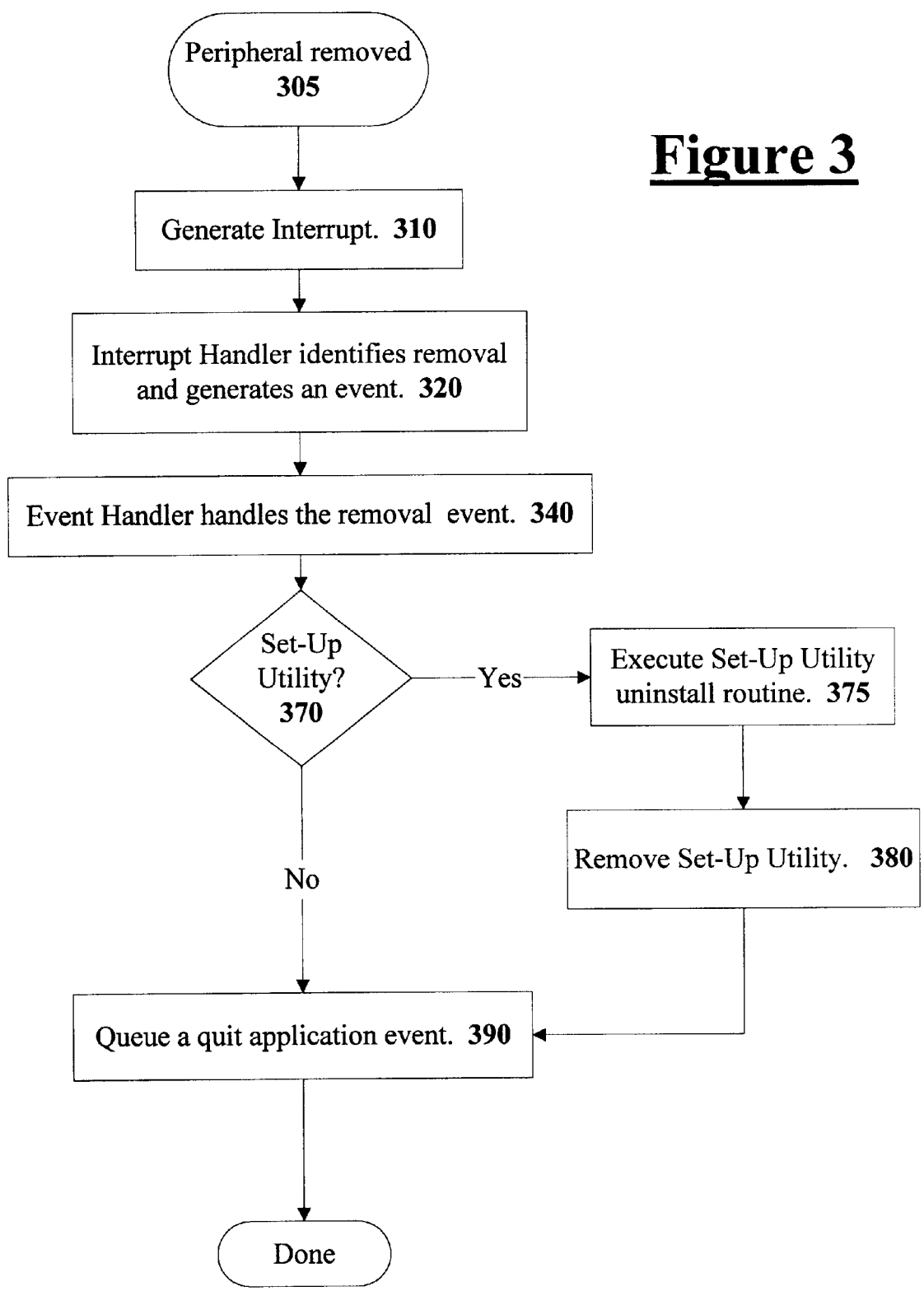
FIG. 3 illustrates a flow diagram of the operations performed when a peripheral device is removed from an expansion interface.

FIG. 3 illustrates an overview of how the mobile computer system handles peripheral device removals. The flowchart of FIG. 3 begins when a user removes a peripheral device from the peripheral expansion interface at step 305. An interrupt handler identifies the removal of the peripheral device from the peripheral expansion interface at step 320 and queues a peripheral device removal event onto an event queue.

At step 340, the event handler handles the peripheral device removal event. The event handler handles the peripheral device removal event by updating system data structures to indicate the removal of the peripheral device.

At step 370, the event handler determines if there is a set-up utility in the main memory that is associated with the removed peripheral device. If a designated set-up utility is located, the peripheral device removal routine of the event handler executes a removal routine in the set-up utility. In one embodiment, the event handler executes the set-up utility at step 375 with a "remove" indication that indicates the set-up utility should uninstall itself and all drivers associated with the removed peripheral device. At step 380, the set-up utility is removed from the mobile computer system's memory since the set-up utility for the peripheral is no longer needed. At this point, all driver programs associated with removed peripheral that are no longer needed have been removed from the mobile computer system.

At step 390, the event handler queues a quit application event. In this manner, the currently executing application (that may be using the peripheral device) will gracefully cease execution.

Peripheral Device Insertion

The details behind having the mobile computer system 100 react appropriately when a user inserts a peripheral into the expansion interface 110 are not trivial. The operation of the mobile computer system 100 in response to the insertion of a peripheral into the expansion interface 110 of the mobile computer system 100 will be presented with reference to FIGS. 2, 5, 6, and 7. As set forth in FIG. 2, one embodiment of the mobile computer system 100 uses an interrupt signal to notify the mobile computer system of peripheral device insertions.

Peripheral Insertion Interrupt Generation

One embodiment of the mobile computer system 100 uses an interrupt generator circuit to generate peripheral device insertion interrupt signals. The interrupt generator circuit detects a card insertion by looking for a rising edge on an interrupt signal coupled the peripheral expansion interface 110. The interrupt generator circuit is actually a state based detection circuit wherein the interrupt generator circuit coupled to a signal from the expansion interface behaves in a different manner depending on a current state of the interrupt generator circuit.

Figure 4:
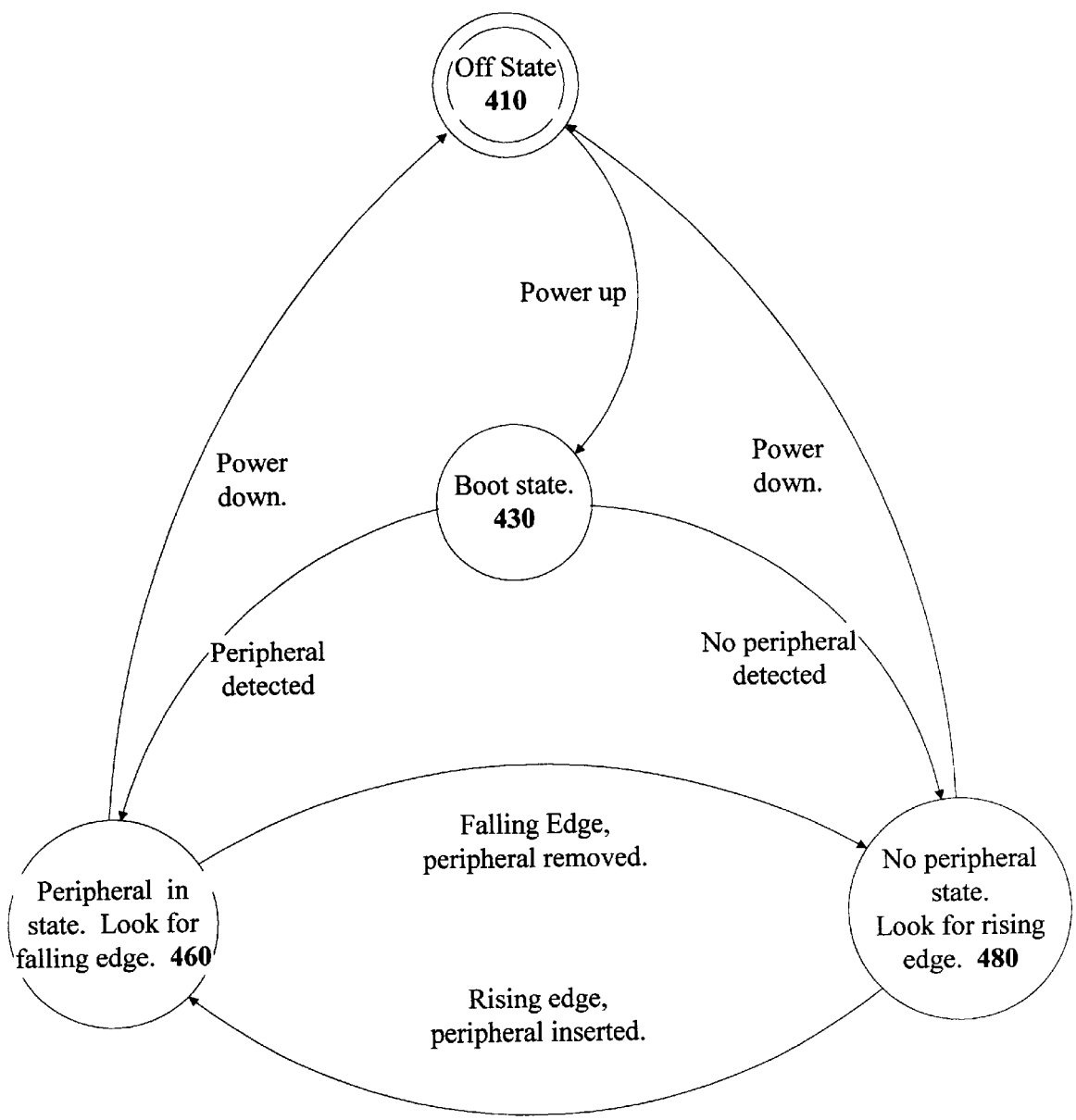
FIG. 4 illustrates a state diagram of one possible peripheral insertion/removal interrupt generator.

FIG. 4 illustrates a state diagram of the peripheral insertion/removal interrupt generator circuit. Initially, when the mobile computer system is powered off, the interrupt generator circuit is in an off state 410. When the mobile computer system is powered on, the peripheral insertion/removal interrupt generator circuit enters a boot state 430 where the interrupt generator circuit determines if there currently is a peripheral device in the expansion interface. If the peripheral insertion/removal interrupt generator circuit detects a peripheral device coupled to the expansion interface then the interrupt generator circuit proceeds to the "peripheral-in" state 460. Otherwise, if the peripheral insertion/removal interrupt generator circuit does not detect a peripheral device coupled to the expansion interface, then the interrupt generator circuit proceeds to the "no peripheral" state 480.

In the peripheral-in state 460, the peripheral insertion/removal interrupt generator circuit looks for the falling edge of a signal from the peripheral expansion interface. If a falling edge signal is detected then the peripheral insertion/removal interrupt generator circuit generates a peripheral removal interrupt and moves to the no peripheral state 480. In the no peripheral state 480, the peripheral insertion/removal interrupt generator circuit looks for the rising edge of a signal from the peripheral expansion interface. If a rising edge signal is detected then the peripheral insertion/removal interrupt generator circuit generates a peripheral insertion interrupt and moves to the peripheral-in state 460.

Peripheral Insertion Interrupt Handling

Figure 5:
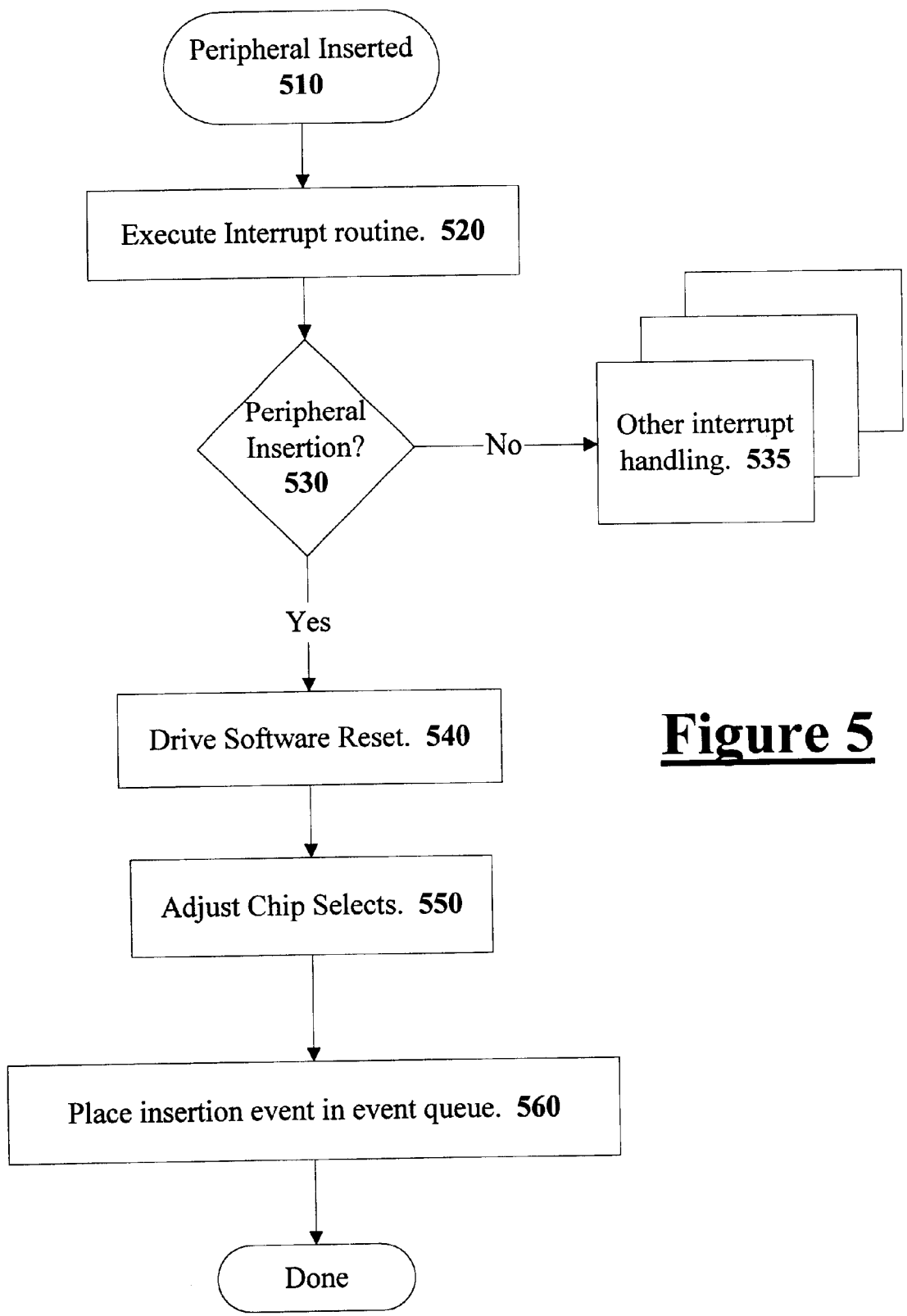
FIG. 5 illustrates a flow diagram describing an interrupt routine for handling peripheral device insertions.

Referring to FIG. 5, once a user inserts a peripheral at step 510 an interrupt signal is generated. An interrupt handler takes over processing at step 520. At step 530, the interrupt handler determines if the interrupt was caused by a peripheral insertion. If the interrupt was caused by another device, then some other interrupt handler handles the interrupt as set forth in step 535.

When a peripheral device insertion is detected, the interrupt handler first forces a reset of the inserted peripheral device hardware at step 540. The reset causes the inserted peripheral device hardware to enter an operational state such that the features of the peripheral device may be accessed. Next, the interrupt handler adjusts the chip select policy such that the memory and memory mapped input/output on the peripheral card can be accessed by software running on the mobile computer system. In one embodiment, the interrupt handler simply adjusts the chip select policy to access the largest possible peripheral memory. At step 560, the interrupt handler places a peripheral insertion event into an event queue. The peripheral insertion event will cause the event handler to resume the peripheral configuration. After placing the peripheral insertion event into an event queue, the interrupt handler is finished handling the peripheral insertion interrupt.

Peripheral Insertion Event Handling

Figure 6:
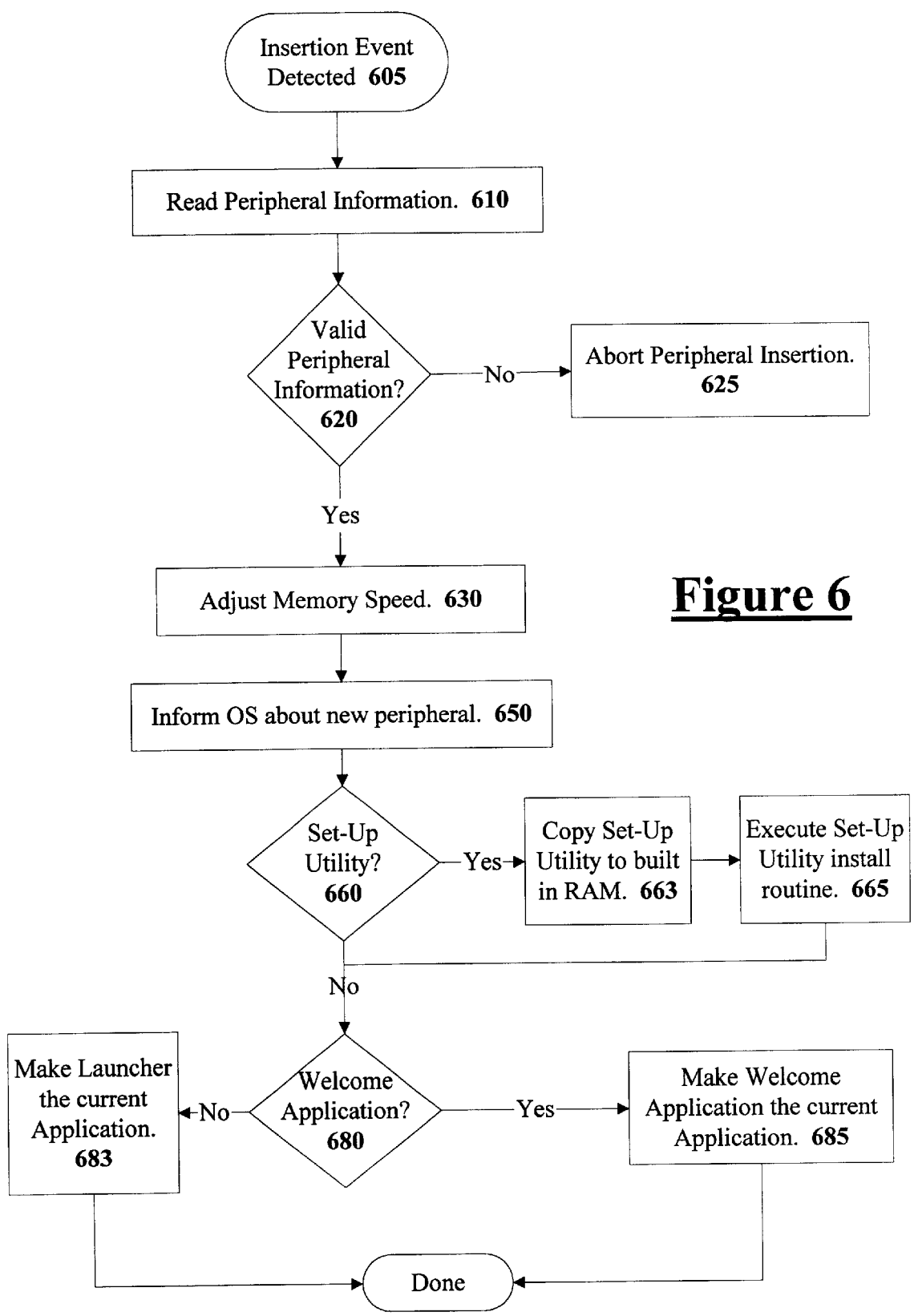
FIG. 6 illustrates a flow diagram describing an event handler for handling peripheral insertion events.

The event handler in the operating system will eventually encounter the peripheral insertion event. FIG. 6 illustrates how the event handler handles a peripheral insertion event. Referring to FIG. 6, the event handler first reads a predefined section of the peripheral memory space to obtain information about the inserted peripheral. Before the event handler performs the memory read, the event handler first sets the processor to issue the read with the greatest possible number of wait states. In this manner, the memory read will work for even the slowest type of memory that can work with the processor.

After reading the section containing the peripheral information, at step 620 the event handler validates the information that was read from the peripheral memory. If the peripheral information does not validate properly, then the event handler may inform the user of the invalid peripheral. The event handler may then abort the preparation for the invalid peripheral device at step 625.

If the peripheral information read from the peripheral device validates properly, then the event handler prepares the handheld computer for interacting with the newly inserted peripheral device. The event handler first reads a value from the peripheral device that specifies the minimum number of wait states needed to handle the memory used in the peripheral device. The event handler then adjusts the processor's behavior, at step 630, to wait the minimum number of wait states when accessing the memory on the peripheral device.

At step 650, the event handler then informs the operating system about the inserted peripheral. In one embodiment based upon the PalmOS from Palm Computing of Santa Clara, Calif., the event handler informs the operating system by updating system data structures to indicate the presence of a second memory card that may contain additional programs. The operating system will examine the added memory card and add the additional programs to the file system listing.

Next, at step 660, the event handler determines if the peripheral device has an associated set-up utility. If the peripheral device has an associated set-up utility, then the event handler proceeds to step 663 where the event handler copies the peripheral device's set-up utility into the main memory of the mobile computer device. By copying the set-up utility into the main memory of the mobile computer device, the set-up utility will continue to be available even if the user later pulls out the peripheral device. After copying the set-up utility into the main memory of the mobile computer device, the event handler executes the set-up utility at step 665 with an "install" signal. The install signal informs the set-up utility that it should perform all the necessary peripheral device specific installation operations. Details on the set-up utility installation will be provided in the following section.

After executing the set-up utility (if there was one), the event handler determines if the peripheral device has an associated "welcome application" at step 680. A welcome application is an application that has been designated by the peripheral device as an application that should always begin executing after the peripheral device has been installed. For example, a cellular telephone peripheral may designate a cellular telephone application as a welcome application that should be executed when the cellular telephone peripheral is installed. If a welcome application has been designated, then the welcome application is designated as the current application at step 685 such that the welcome application will begin execution. If no welcome application has been designated, then a default application is designated as the current application at step 683 such that the default application will begin execution.

In an embodiment that uses the PalmOS from Palm Computing, Inc., the launcher application is set as the default application. In this manner, the launcher application will begin execution when no welcome application has been designated. Since the operating system is informed about the new peripheral device at step 650, the launcher application will now display any new applications that are newly available due to the insertion of the peripheral device.

Peripheral Insertion Set-Up Utility Install Operation

Figure 7:
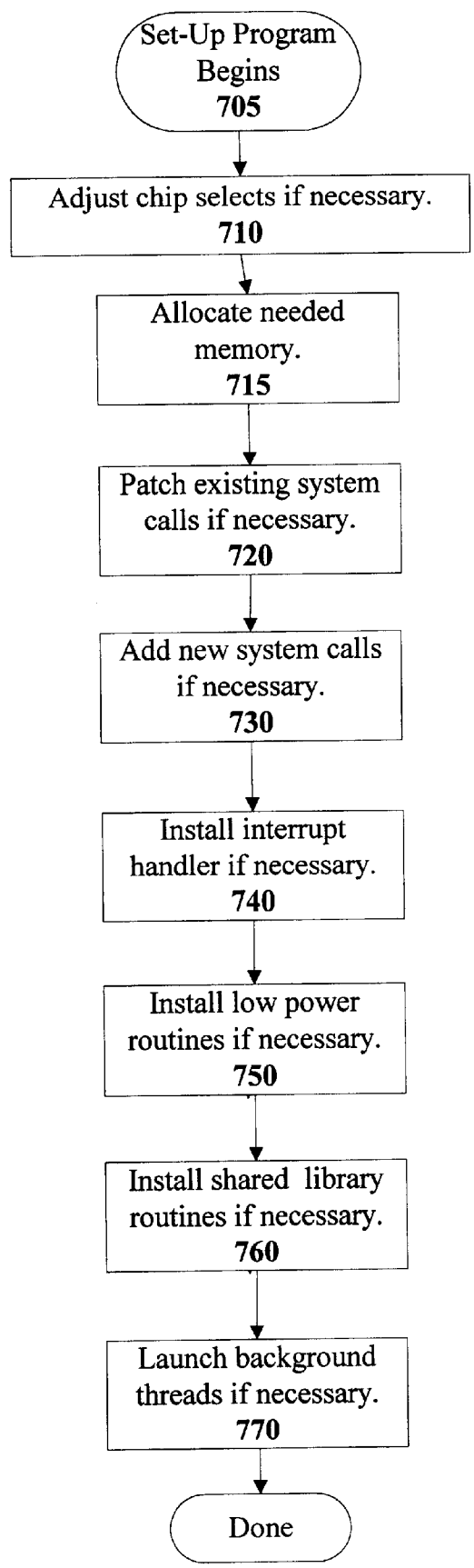
FIG. 7 illustrates a flow diagram describing an installation routine for a set-up utility that accompanies a peripheral device and is executed upon peripheral insertion events.

As illustrated in FIG. 6, the event handler uses a set-up utility on the peripheral device to perform all peripheral specific installation operations. FIG. 7 provides a list of operations that may be performed by a set-up utility. The reader should note that not all of the steps in FIG. 7 need be performed by all set-up utility applications. Each peripheral set-up utility will only perform the operations necessary to prepare the installed peripheral device for operation. Furthermore, the set-up utility may perform operations not listed in FIG. 7.

Referring to FIG. 7, the set-up utility program begins at step 705. At step 710, the set-up utility may adjust the operation of the chip selects used to address the memory on the inserted peripheral device. The set-up utility program modifies the chip select policy to properly handle the actual size of memory & I/O address space contained within the peripheral device. The chip select policy is adjusted using the actual size of memory & I/O address space required by the peripheral software.

At step 715, the set-up utility allocates an amount of main memory that the peripheral needs for operation. The main memory will be used to store state variables associated with the peripheral device. Memory is allocated by the set-up utility since some systems do not allow the allocation of memory within interrupt routines.

At step 720, the set-up utility patches systems calls if necessary. In one embodiment, system calls may be listed in a jump table that contains a list of vectors to system calls. The set-up utility may patch a system call by copying a new system call routine into main memory and then changing the vector in the jump table to point to the new system call.

At step 730, the set-up utility may install new system calls. The new system calls may provide additional functionality to the operating system of the computer system. Some applications may be designed to use this additional functionality if and when it becomes available due to the insertion of a peripheral device.

At step 740, the set-up utility may install a peripheral device interrupt handler. In one embodiment, an interrupt line is coupled to the expansion interface on the mobile computer system. It should be noted that this expansion interface interrupt line is distinct from the peripheral insertion interrupt line. The peripheral device's set-up utility may install a peripheral device interrupt handler for that interrupt line. The newly installed peripheral device interrupt handler would obtain control of the processor at any time when an interrupt on the expansion interface interrupt line is asserted.

To conserve power, most mobile computer devices have a power management system that allows power to be saved by turning off circuits and devices that are not being used. To reduce power consumption, the peripheral device should install power management routines at step 750 that will be called by the operating system at appropriate times. For example, a power off routine may be called when the mobile computing device is turned off. Similarly, an idle power down routine may be called when the mobile computing device has been idle for a pre-determined period. A low power routine may be designated to be called by the operating system when the battery is low.

Many peripherals will provide services to other application programs. For example, a wireless networking peripheral will provide network services such as TCP/IP to other applications. To provide the services to the other applications, such as a wireless networking peripheral may provide a set of shared libraries that may be accessed by other applications. The set-up utility should install such shared libraries as designated in step 760 of FIG. 7.

Some peripherals will require background tasks to monitor activities on the peripheral device. The set-up utility should launch such background threads at step 770.

Once the set-up utility has completed execution, the peripheral device is ready for operation. If the peripheral device provides shared services, those services are now available. If the peripheral device is controlled by a dedicated application, then that dedicated application will be launched as the "welcome application" as depicted in steps 680 and 685 of FIG. 6.

Peripheral Removal

Peripheral device removal is handled in a similar manner as peripheral insertion. In most cases, the removal is handled by first detecting a removal with an interrupt routine, modifying the chip select policy, queuing a removal event from the interrupt routine, and then handling the removal event with an event handler. The event handler handles the removal event by calling the set-up utility associated with the peripheral device with a "removal" signal.

The peripheral removal handling may be interrupted by a hardware exception if any application program, interrupt routine, or other program attempts to access memory space that was mapped to the removed card. The change in chip select policy made by the removal interrupt handler causes such hardware exception interrupts.

Peripheral Removal Interrupt

Figure 8:
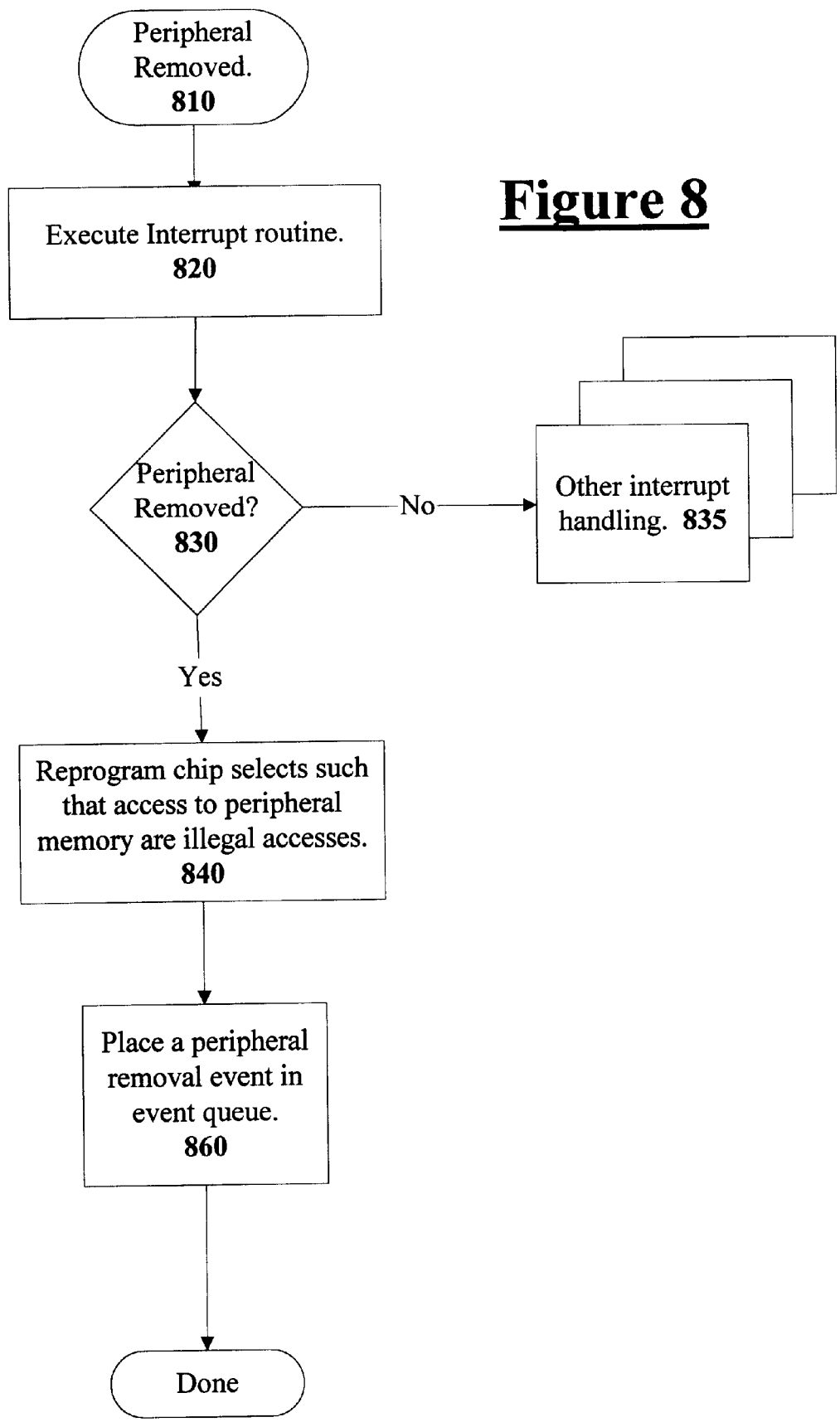
FIG. 8 illustrates a flow diagram describing an interrupt routine for handling peripheral device removals.

As illustrated in FIG. 3, the removal of a peripheral device generates an interrupt at step 310. An interrupt handler then identifies the peripheral device removal interrupt and handles the peripheral device removal interrupt at step 320. FIG. 8 illustrates one embodiment of a peripheral device removal interrupt handler.

As illustrated in FIG. 8, the interrupt handler begins at step 820. At step 830, the interrupt determines if the interrupt was caused by a peripheral device removal. If not, another interrupt handler handles the interrupt as show at step 835.

When a peripheral device removal interrupt has been identified at step 830, the peripheral removal interrupt routine first reprograms the chip selects for the mobile computer system. The reprogramming indicates that any future access to peripheral device memory space is an illegal access at step 840. In this manner, if any program attempts to access a memory location on the peripheral card, then a bus error exception will be generated. The bus error exception will be handled by a bus error routine that will be described in a later section of this document.

After reprogramming the chip selects at step 840, the peripheral device removal interrupt routine then places a peripheral removal event in an event queue at step 860. The peripheral removal event will cause the event handler to begin executing a peripheral removal routine. The peripheral removal routine of the event handler will handle the remainder of the peripheral removal processing (unless a bus error occurs).

Peripheral Removal Event Handling

Figure 9:
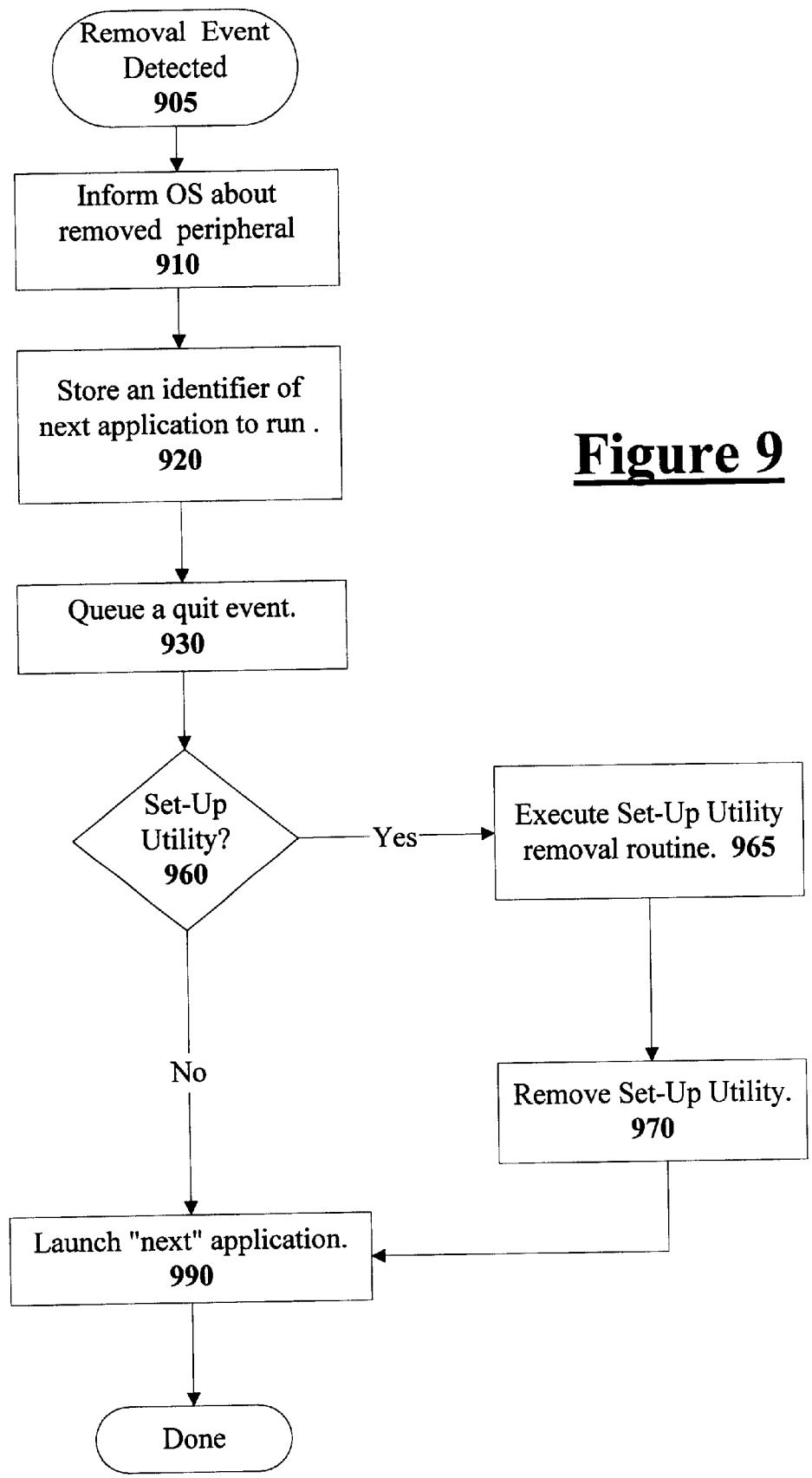
FIG. 9 illustrates a flow diagram describing an event handler for handling peripheral removal events.

The event handler in the operating system will eventually encounter the peripheral removal event that was placed into the event queue by the interrupt routine if a bus error does not occur first. FIG. 9 illustrates how the event handler handles a peripheral removal event.

Referring to FIG. 9, the event handler first informs the operating system about the removed peripheral device at step 910. In one embodiment based upon the PalmOS from Palm Computing of Santa Clara, Calif., the event handler informs the operating system by updating system data structures to indicate one less memory card. The Operating system will then become aware of the removed card such that it may remove all references to the additional programs and data that were formerly available on that peripheral device.

At step 920, the event handler stores the identifier of the application that is currently executing into a location that specifies the next application to execute. Next, at step 930, the event handler queues a quit event into the event queue for the currently executing application. In this manner, when the current application resumes execution, it will gracefully terminate itself. After terminating itself, the operating system will begin execution of the next application to execute. Since the identifier of the current application has been specified as the next application to execute, that application will restart itself. In this manner, the application will restart in the altered environment wherein the peripheral device has been removed.

For example, if a web browsing application is currently using a wireless networking peripheral when the wireless networking peripheral is removed, then that web browsing application is automatically shut down. When the web browsing application attempts to restart, it may abort execution since no network peripheral is available to handle network requests.

At step 960, the event handler determines if the peripheral device had installed an associated set-up utility. If the peripheral device has an associated set-up utility, then the event handler proceeds to step 965 where the event handler executes the set-up utility at step 965 with a "removal" signal. The removal signal informs the set-up utility that it should perform all the necessary peripheral device specific removal operations. For example, the removal portion of the set-up utility will remove all interrupt handlers, shared libraries, device drivers, etc. that are associated with the removed peripheral. Details on the removal portion of the set-up utility will be provided in the following section.

After executing the set-up utility (if there was one), the event handler returns such that the current application will resume execution. Since a quit application event had been scheduled by the event handler routine, the current application will terminate itself. Furthermore, the operating system will relaunch the current application since that application was designated as the "next" application to run in step 920.

Set-Up Utility Removal Operation

Figure 10:
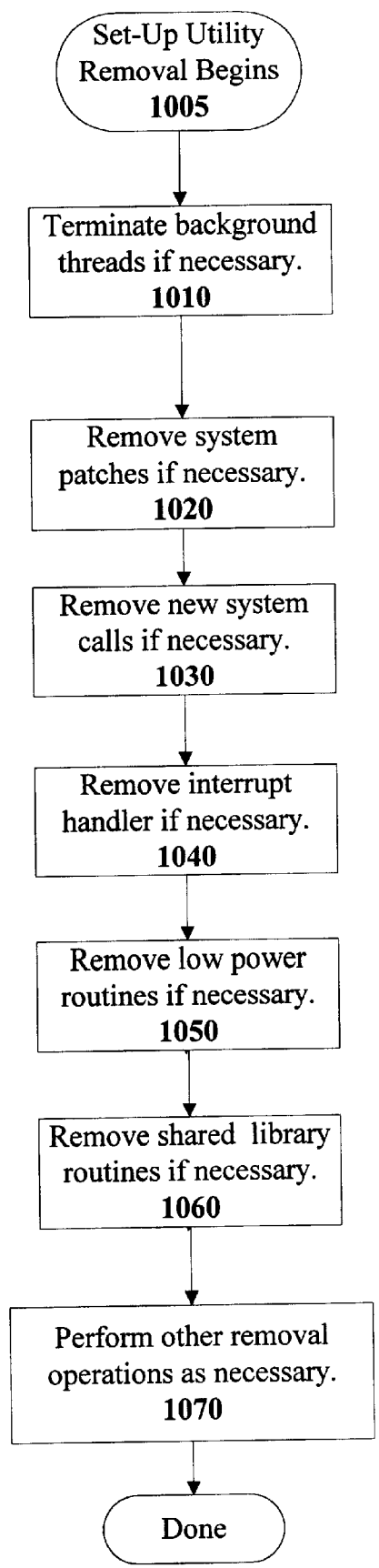
FIG. 10 illustrates a flow diagram describing a removal routine for a set-up utility that undoes changes made to the computer system by the installation routine of the set-up utility when the peripheral device was inserted.

As illustrated in FIG. 9, the event handler uses the set-up utility that is resident in the main memory on to perform all peripheral specific removal operations. FIG. 10 provides a list of operations that may be performed by the removal portion of the set-up utility. Again, the reader should note that not all of the steps in FIG. 10 need be performed by the removal routines of all set-up utility applications. Each set-up utility removal routine will only perform the removal operations necessary to undo the changes made when the set-up utility was run to prepare for the operation of the peripheral device.

Referring to FIG. 10, the set-up utility program begins at step 1005. At step 1010, the removal routine of the set-up utility should terminate any background threads that were launched to help control the peripheral device. These threads should be terminated quickly to prevent the peripheral threads from attempting to access the removed peripheral device.

At step 1020, the removal routine of the set-up utility removes any patches made to the systems calls if necessary. Any patch that requires access to the peripheral device is removed from the computer system. In one embodiment, certain system calls that are not directly associated with the removed peripheral device may be left in the mobile computer systems memory. In this manner, patches to cure operating system defects may be made to the operating system without requiring the user to obtain and install the operating system patch. Instead, when the user purchase a new peripheral device, the peripheral may insert an operating system patch if the patch has not already been made. However, the user may specify that such involuntary patches not be made unless necessary.

At step 1030, the removal routine of the set-up utility removes any patches made to the system calls or any new system calls that were added during the peripheral installation as necessary. Any added system calls that require access to the peripheral device are removed from the computer system. As set forth in the previous paragraph, certain added system calls that are not directly associated with the removed peripheral device may be left in the mobile computer systems memory. In this manner, extension to the operating system may be made to the operating system without requiring the user to obtain and install the operating system extensions. Thus, when a user purchases a new peripheral device, the peripheral may also provide operating system extensions.

At step 1040, the removal routine of the set-up utility removes any interrupt handlers associated with the removed peripheral. Such interrupt handlers are no longer appropriate since the peripheral device has been removed.

At step 1050, the removal routine of the set-up utility removes any power management routines associated with the removed peripheral device. Such power management routines are no longer appropriate since the peripheral device has been removed.

At step 1060, the removal routine of the set-up utility removes shared libraries associated with the peripheral device that were installed when the peripheral device was inserted. Other operations to handle the peripheral removal may be performed as listed in step 1070.

Once the removal routine of the set-up utility has completed execution, all of the system software associated with the peripheral device has been removed. When the removal routine of the set-up utility returns to the event handler, the event handler completes the peripheral driver removal process by deleting the set-up utility from main memory at step 970. Finally, at step 990, the operating system will relaunch the current application by running the "next" application.

Bus Error caused by Peripheral Device Removal

When a user removes a peripheral device from the expansion port of the mobile computer device, an executing application may mistakenly attempt to access a memory or input/output location in the peripheral device's memory space. When this occurs, a bus fault will occur since the processor will not receive any response from the removed memory location. To handle such situations, a special bus error exception routine resides within the operating system of the mobile device.

Figure 11:
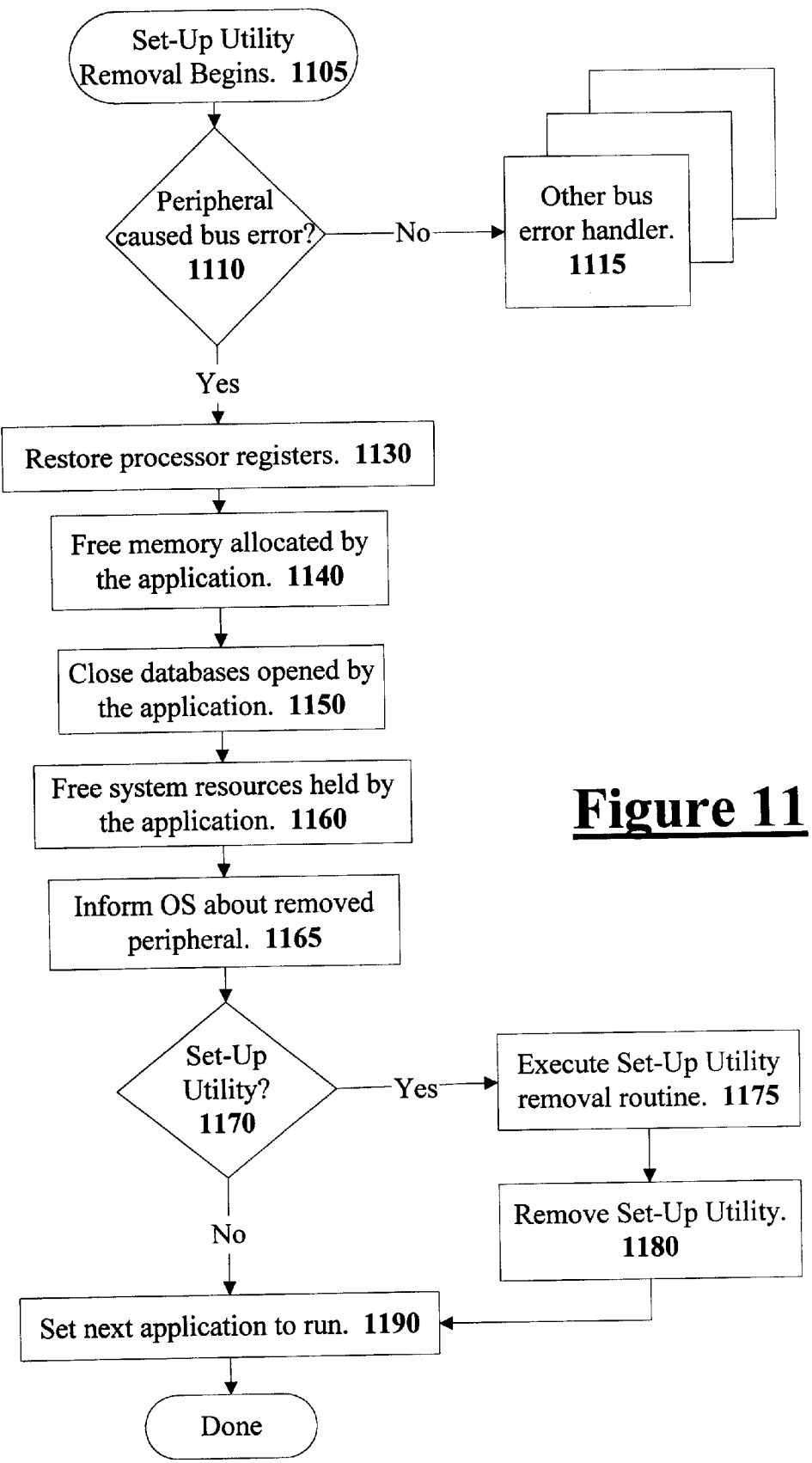
FIG. 11 illustrates a flow diagram describing a bus error exception routine that handles bus errors caused by removing a peripheral device from a computer system.

FIG. 11 illustrates how one embodiment of a bus error exception routine may operate. When the bus error exception routine begins, the bus error exception routine first determines if the bus error was caused by the removal of a peripheral at step 1110. One simple method of making such a determination is to look at the address of the memory access that caused the bus error exception. If the address was within the peripheral device memory space, then the bus error was probably caused by a peripheral device removal. If the bus error was not caused by a peripheral removal, then other bus error handling code is executed at step 1115.

When it has been determined that the bus error exception was caused by a peripheral removal, then the bus error exception handler attempts to kill the application program that caused the bus error exception and restore the state of the computer system to a state that the computer system was in before the application program that caused the bus error began. The bus error exception handler begins this process at step 1130 by restoring a set of registers (including the stack pointer) to the values that these register had before the offending application was launched. One of those values is the identifier of the application being launched.

At step 1140, the bus error exception handler frees all the memory that was allocated by the application that caused the exception. In a PalmOS environment, the freeing of memory can easily be performed since all memory allocations are marked by the identifier of the application that allocated the memory. Thus, the bus error exception handler simply frees all memory blocks marked with the application identifier of the offending application. In a PalmOS system, a "SysAppExit()" system call can be used to free the allocated memory. The "SysAppExit()" system call "walks" through the memory heap looking for memory blocks associated with a particular application identifier and frees those memory blocks.

At step 1150, the bus error exception handler closes all the databases that were opened by the application that caused the bus error exception. The "SysAppExit()" system call in the PalmOS system also performs the task of closing opened databases. The open databases are identified by the application identifier.

At step 1160, the bus error exception handler frees up any other system resources allocated to the application that caused the bus error exception. In one embodiment, any semaphores owned by the application that caused the bus error exception are removed. At this point, the application has essentially been killed.

Next, at step 1165, the bus error exception handler informs the operating system that the peripheral device was removed such that the operating system does not attempt to use any resources from the peripheral device. In one embodiment based upon the PalmOS from Palm Computing of Santa Clara, Calif., the bus error exception handler informs the operating system by updating a system data structure to indicate that the second memory card has been removed from the mobile computer system.

At step 1170, the bus error exception handler determines if the peripheral device had an associated set-up utility application. If a set-up utility application is located, the bus error exception handler calls the removal routine of the set-up utility at step 1175 to remove all drivers, interrupt handlers, patches, etc. associated with the peripheral device. After the set-up utility application has executed, the bus error exception handler removes the set-up utility from the mobile computer system memory at step 1180.

Finally, at step 1190, the bus error exception handler sets the next application to run. The bus error exception handler may use the application identifier as the application that was just terminated in order to force the application to restart in the new execution environment without the peripheral device available. The restarted application will determine how it should proceed without the peripheral device. The bus error exception handler may also select an application other than the application that was terminated. In one embodiment, the bus error exception handler may designate the next application to run to be the launcher application for the mobile computer system.

Peripheral Device Examples

To completely describe how the robust expansion system of the present invention may be used, a couple of expansion peripheral expansions are provided.

Modem peripheral

One type of peripheral that can be created is a modem peripheral for creating serial data connections through telephone lines. The modem peripheral should be accompanied with device drivers that control the operation of the modem peripheral.

When a modem peripheral is inserted into the expansion interface of a computer system constructed according to the teachings of the present invention, the insertion will generate an interrupt. The interrupt will be classified as a peripheral insertion event such that a peripheral insertion event will be placed onto the event queue.

The event handler will handle the peripheral insertion event as specified in FIG. 6. Initially, the event handler will read and validate peripheral configuration information from the memory space of the peripheral device. Using the peripheral configuration information, the event handler will adjust the memory speed as designated in step 640. The event handler will then inform the OS about the new peripheral as designated in step 650.

Next, the event handler copies a set-up utility located in the peripheral device memory space into the main memory. The event handler then calls the set-up utility with an install signal to have the set-up utility install the necessary driver software.

The modem peripheral's set-up utility will then install all the driver software necessary to allow applications to use and access the modem peripheral. The modem peripheral's set-up utility will install shared libraries for the modem and an interrupt handler for servicing the modem. In one embodiment, the modem set-up utility may designate the modem as the default Universal Asynchronous Receiver Transmitter (UART) such that future serial accesses attempt to use the modem.

The modem peripheral may include a default application program such as a terminal emulation program. That terminal emulation program may be designated as the "welcome application" on the modem peripheral device such that the terminal emulation application automatically launches after inserting the modem peripheral into the expansion interface.

When the modem peripheral is removed, another interrupt will be generated and identified as an interrupt caused by a peripheral device removal. The removal will cause the interrupt handler to queue a peripheral removal event. The event handler will then process the peripheral removal event as designated in FIG. 9. Specifically, the removal event handler will inform the OS that the peripheral has been removed and queue a quit event for the currently executing application. The peripheral removal event handler next calls the removal routine of the set-up utility to remove all the modem drivers that were installed by the install routine in the set-up utility. Finally, the peripheral removal event handler removes the set-up utility from the mobile computer system's main memory.

If the user pulls out the modem peripheral while the terminal application is accessing memory space mapped onto the modem peripheral then a bus error exception may be generated. The bus error exception will be handled by a bus error exception handler. That bus error exception handler will then perform the operations specified in FIG. 11. Specifically, the bus error exception handler will manually kill the currently executing application (which could be the terminal application). Next, the bus error exception handler will call the removal routine of the set-up utility to remove all the modem drivers that were installed by the install routine in the set-up utility. The bus error exception handler then removes the set-up utility from the mobile computer system's main memory.

Back-up peripheral

Not all peripheral devices will need sophisticated driver software. For example, a simple portable back-up peripheral can be implemented with the teachings of the present invention just using a flash memory card peripheral and a back-up program. Specifically, the flash memory card peripheral will designate the back-up program as the welcome application such that the back-up application will be automatically launched when the peripheral device is inserted.

When the back-up peripheral is inserted, the interrupt routine will place a peripheral insertion event onto the event queue. The event handler will handle the peripheral insertion event as specified in FIG. 6. Initially, the event handler will read and validate peripheral configuration information from the flash memory space of the peripheral device. Specifically, the event handler will adjust the memory speed as designated in steps 640 to accommodate the flash memory card. The event handler will then inform the OS about the new peripheral as designated in step 660.

The event handler will then look for a set-up utility in the flash memory. Since the back-up peripheral does not need any special drivers, the event handler will not find a set-up utility and proceed to look for a welcome application. The installer will then designate the back-up welcome application as the next application to execute as specified in steps 680 and 685.

The welcome application (the back-up application) with then begin executing. In one embodiment, the back-up application will ask the user if he/she wishes to back-up or restore data from the flash memory card. If the user selects a back-up, then the back-up application will proceed to back-up the contents of the mobile computing device's main memory into the flash memory of the back-up peripheral. Standard techniques such as incremental back-ups may be performed to save time and power consumption. If the user wishes to restore data from the back-up flash peripheral then the back-up application will present a series of screen displays that will allow the user to restore all or some of the lost data.

A Second External Interface With I/O Support

Mobile computer systems, such as the mobile computer system illustrated in FIGS. 1A and 1B, often use simple input mechanisms for inputting data. For example, the mobile computer system illustrated in FIGS. 1A and 1B provides a digitizer pad that can be written on using a stylus. The user's handwriting is then interpreted by the interface software to generate normal character data such as ASCII (American Standard Code for Information Interchange) or UNICODE character values. Some mobile computer systems use a small keypad illustrated on the display for entering text. While such simple input mechanisms are useful while traveling, many users desire to have standard input mechanisms when the mobile computer system is being used in a normal work environment such as an office.

The most standard computer input mechanism is the well-known QWERTY keyboard. A QWERTY provides the most well known user interface to users. Another popular input mechanism is speech to text systems that interpret what a user says and generates a stream of text. Dragon System's Naturally Speaking and IBM's ViaVoice are examples of speech to text systems.

Alternate Input support

Most portable computer systems only provide one mechanism for inputting data. To provide a flexible system of allowing data input, the present invention introduces an alternative input port. Specifically, the present invention discloses an input port that automatically recognizes and accepts input from external input devices.

Referring to FIG. 1A, the mobile computer system includes an external interface 150. The following table describes the pin-out of the external interface 150:

TABLE 1

| INTERFACE CONTACT | CONTACT FUNCTION |
| --- | --- |
| 1 | RXD: Serial Receive |
| 2 | alternate cradle detect pin |
| 3 | Synchronize Interrupt |
| 4 | GND: Common Ground |
| 5 | USB: Data− |
| 6 | USB: Data+ |
| 7 | Peripheral Charge Power |
| 8 | TXD: Serial Transmit |

The external interface 150 includes the contacts necessary for coupling to another computer system in two different manners: Universal Serial Bus and Serial Port. As illustrated in Table 1, the external interface 150 includes a set of Universal Serial Bus (USB) signals for communicating with a computer system that has a Universal Serial Bus port. Specifically, the external interface 150 has a USB Data+ signal, a USB Data− signal, and a common ground. (The USB VBus power signal may be used in other implementations, not shown.) The external interface 150 also includes a Serial Transmit, a Serial Receive, and a Common Ground for communicating with a computer system or peripheral through a standard serial port. The external interface 150 further includes a synchronization interrupt line that activates an interrupt on the mobile computer system such that the mobile computer can handle the interrupt. In one embodiment, the interrupt is used to activate a synchronization program use to synchronize information on the mobile computer system with another computer system.

The external interface 150 further includes an alternate cradle detect pin. The alternate cradle detect pin is an input pin that is activated by certain peripherals that couple to the external interface 150. One class of peripheral devices that may activate the alternate cradle detect pin are input devices that are coupled the external interface 150. The operating system in the mobile computer system 100 periodically polls the alternate cradle detect pin such that when the alternate cradle detect pin is activated, the operating system launchers a handler for handling user input from the external interface 150.

Figure 12:
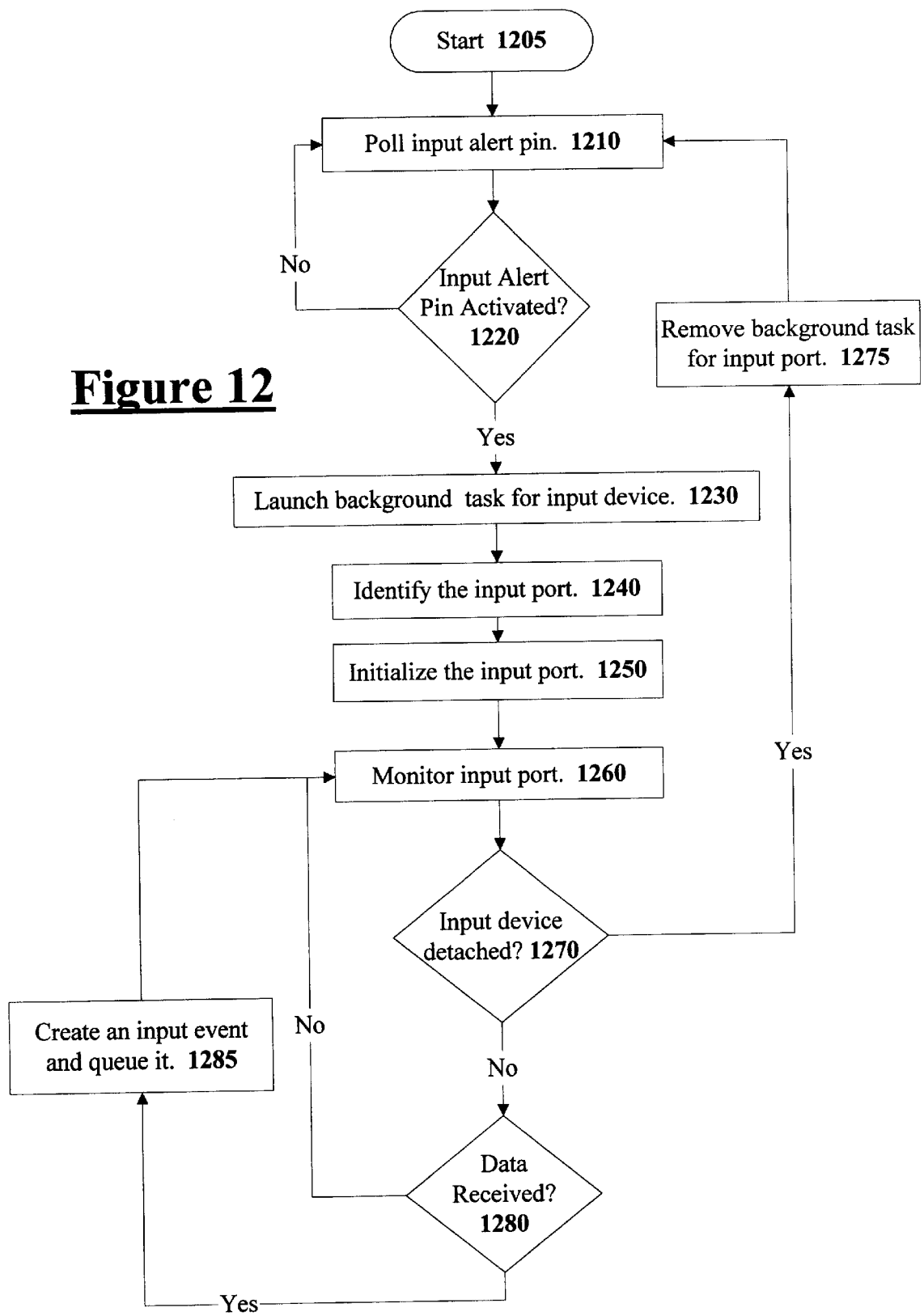
FIG. 12 illustrates a flow diagram describing how the input alert pin can be used to identify and support external input devices.

FIG. 12 illustrates one embodiment of a flow diagram that describes how one embodiment of a mobile computer system can handle the alternate cradle detect pin. Referring to FIG. 12, the mobile computer system polls the alternate cradle detect pin at step 1210. At step 1220, the mobile computer system determines if the alternate cradle detect pin was activated. If the alternate cradle detect pin was not activated, then the mobile computer system continues to poll the alternate cradle detect pin by returning to step 1210. If the alternate cradle detect pin was activated, then the mobile computer system proceeds to step 1230.

At step 1230, the mobile computer system launches a background task for handling the input device that was recently connected. From this point forward, the background task may be used to perform the steps of the method. At step 1240, the input port that had a device connected is identified. In one embodiment, the input device may use the serial port interface or the Universal Serial Bus interface. A defined set of protocols can be used to identify an input device coupled to the Universal Serial Bus interface. In another embodiment, step 1240 is not required since only one of input interfaces may be used for input devices. For example, only the serial port interface may be used.

At step 1250, the background task initializes the interface port to which the input device was connected. At step 1260, the background task now monitors the interface port to which the input device was connected. When any input or change on the monitored port is detected, the background task handles the input/change.

At step 1270, the background task determines if the input device was detached from the input port. This can be detected by testing the alternate cradle detect pin occasionally (polling). If the input device was detached, then the background task proceeds to step 1275 where the input port is closed and the background task is shut down. The method proceeds back to step 1210 where the alternate cradle detect pin is then polled.

At step 1280, the background task determines if data was received from the input device. If data was received from the input device, the background task queues an input event to the event queue. The queued input event specifies that data from the external input device has been received. For example, if a keyboard device was coupled to the external interface, then the background task may queue a keyboard event in the event queue.

Alternate Synchronization

The alternate cradle detect pin may be used for other purposes as well. One alternate use in a current embodiment allows the alternate cradle detect pin to specify an alternate synchronization data path. Referring back to Table 1, the external interface includes a USB Data+ signal, a USB Data− signal, and a common ground. These USB data signals allow the mobile computer system to exchange information with a personal computer system.

One of the primary uses for the USB Data signals is to allow the mobile computer system to synchronize its information with information on a personal computer system. Such synchronization systems are well-known. One example is disclosed in U.S. Pat. No. 5,884,323, issued Mar. 19, 1999 entitled "Extendable Method And Apparatus For Synchronizing Multiple Files On Two Different Computer Systems." As specified earlier with reference to Table 1, the external interface 150 may include a synchronization interrupt line that may be used to activate a synchronization program. Normally, the synchronization program would attempt to synchronize with another computer system coupled through the USB connection.

In some situations, a user may wish to synchronize with a remote computer system that is not available through the USB connection. For example, a modem that uses the serial data connection on the external interface allows a mobile computer may remotely connect to other computer systems through a telephone line. One connected, the mobile computer system may synchronize with a remote computer system. An example of such an application is provided in the U.S. patent application entitled "Method And Apparatus For Synchronizing A Portable Computer System With A Desktop Computer System" filed on Jan. 30, 1997 having Ser. No. 08/792,166.

To handle such alternate synchronization environments, the synchronization program may test the alternate cradle detect before commencing with a synchronization. Specifically, if the interrupt routine that handles synchronization interrupt requests first test the alternate cradle pin to detect if an alternate cradle is active. When the alternate cradle pin is activated, the synchronization interrupt routine launches an alternate synchronization program that will use an alternate synchronization path such as the serial data interface on the external interface. Thus, hardware coupled to the external interface, such as modems, should activate the alternate cradle detect pin. Thus, when a synchronization interrupt request is made, the synchronization interrupt handler can launch an associated alternate synchronization program.

The foregoing has described a method and apparatus for implementing a robust external interface for a computer system. It is contemplated that changes and modifications may be made by one of ordinary skill in the art, to the materials and arrangements of elements of the present invention without departing from the scope of the invention.

We claim:

1. A method of providing robust computer expansion, said method comprising:
   detecting a peripheral inserted into a computer system;
   copying a set-up application from a first memory space on said peripheral to a second memory space in said computer system;
   executing an install routine in said set-up application after said copying; and
   executing a removal routine in said set-up application in said second memory space in response to a removal of said peripheral from said computer system.

2. The method as claimed in claim 1, said method further comprising:
   executing a welcome application in said first memory space on said peripheral after executing said install routine in said set-up application.

3. The method as claimed in claim 1, said method further comprising:
   installing driver programs into said computer system from said install routine in said set-up application, said driver programs associated with said peripheral.

4. The method as claimed in claim 1, said method further comprising:
   installing operating system extensions into said computer system from said install routine in said set-up application.

5. The method as claimed in claim 1, said method further comprising:
   detecting removal of said peripheral from said computer system by detecting a bus error from an access to said first memory space on said peripheral.

6. The method as claimed in claim 1, said method further comprising:
   detecting said removal of said peripheral from said computer system by detecting a falling edge from a signal on an expansion interface.

7. The method as claimed in claim 1 wherein detecting said peripheral inserted into a computer system comprises detecting a rising edge from a signal on an expansion interface.

8. The method as claimed in claim 1, said method further comprising:
   adjusting a chip select policy such that a processor in said computer system can legally access said first memory space on said peripheral.

9. The method as claimed in claim 1, said method further comprising:
   accessing a memory access time definition field from a known location in said first memory space on said peripheral;
   adjusting a memory wait state policy according to said memory access time definition field.

10. The method as claimed in claim 1, said method further comprising:
    installing operating system patches into said computer system from said install routine in said set-up application.

11. The method as claimed in claim 10 wherein said removal routine removes said operating system patches after removal of said peripheral from said computer system.

12. The method as claimed in claim 10 wherein said removal routine leaves said operating system patches after removal of said peripheral from said computer system.

13. The method as claimed in claim 2 wherein said welcome application comprises a back-up program and said back-up program copies information from a memory in said computer system to a nonvolatile storage system on said peripheral.

14. The method as claimed in claim 13 wherein said nonvolatile storage system comprises flash memory.

15. The method as claimed in claim 13, said method further comprising:
    restoring information stored in said nonvolatile storage system back into said memory in said computer system.

16. A method of providing robust expansion for a computer system, said method comprising:
    copying a removal routine from a memory in a peripheral device to a main memory in said computer system upon insertion of said peripheral device into said computer system;
    detecting removal of said peripheral device from an expansion interface of said computer system; and executing said removal routine in said main memory of said computer system that handles the removal of said peripheral device in response to detecting removal of said peripheral device.

17. The method as claimed in claim 16 wherein said removal routine removes driver programs associated with said peripheral device from said computer system.

18. The method as claimed in claim 16 wherein said removal routine removes operating system extensions associated with said peripheral device from said computer system.

19. The method as claimed in claim 16 wherein detecting removal of a peripheral device comprises detecting a bus error from an access to said memory on said peripheral device.

20. The method as claimed in claim 16 wherein detecting removal of a peripheral device comprises detecting a falling edge from an electrical signal on an expansion interface.

21. The method as claimed in claim 16, said method further comprising:
adjusting a chip select policy such that a processor in said computer system can not legally access said memory in said peripheral device.

22. The method as claimed in claim 16 wherein said removal routine leaves an operating system patch installed when said peripheral device was inserted after removal of said peripheral device from said computer system.

23. An extensible computer apparatus, said apparatus comprising:
an expansion interface on a computer system, said computer system having a main memory;
a peripheral device, said peripheral device for insertion into said expansion interface, said peripheral device having a peripheral memory space; and
a set-up utility program, said set-up utility program residing in said peripheral memory space; and
a peripheral detection and handling program on said computer system, said peripheral detection and handling program for detecting when said peripheral device is inserted into said expansion interface and for copying said set-up utility program from said peripheral memory space into said main memory when said peripheral device is inserted, and said peripheral detection and handling program for detecting when said peripheral device is removed from said expansion interface and executing a removal routine in said set-up utility program in said main memory when said peripheral device is removed.

24. The computer apparatus as claimed in claim 23 wherein said peripheral detection and handling program executes said set-up utility after copying said set-up utility program from said peripheral memory space into said main memory.

25. The computer apparatus as claimed in claim 23 wherein said peripheral detection and handling program executes a welcome application stored within said penripheral memory space.

26. The computer apparatus as claimed in claim 23 wherein said set-up utility program installs driver programs into said main memory, said driver programs associated with said peripheral device.

27. The computer apparatus as claimed in claim 23 wherein said set-up utility program installs operating system extensions into said computer system.

28. The computer apparatus as claimed in claim 23 wherein said peripheral detection and handling program detects removal of said peripheral device from said computer system by detecting a bus error caused by an access to said peripheral memory space.

29. The computer apparatus as claimed in claim 23 wherein said peripheral detection and handling program detects removal of said peripheral device from said computer system by detecting a falling edge from an electrical signal on said expansion interface.

30. The computer apparatus as claimed in claim 23 wherein said peripheral detection and handling program detects when said peripheral device is inserted by detecting a rising edge from an electrical signal on said expansion interface.

31. The computer apparatus as claimed in claim 23 wherein said removal routine removes drivers installed by said set-up utility program.

32. The computer apparatus as claimed in claim 23 wherein said peripheral detection and handling program adjusts a chip select policy such that a processor in said computer system can legally access said peripheral memory space on said peripheral device.

33. The computer apparatus as claimed in claim 23 wherein said peripheral detection and handling program accesses a memory access time definition field from a known memory location in said peripheral memory space and adjusts a processor in said computer system according to said memory access time definition field.

34. The computer apparatus as claimed in claim 33 wherein said memory access time definition field comprises a minimum number of wait states for memory accesses.

35. The computer apparatus as claimed in claim 23 wherein said set-up utility program installs an operating system patch into said main memory of said computer system.

36. The computer apparatus as claimed in claim 23 wherein said removal routine in said set-up application removes drivers associated with said peripheral upon removal of said peripheral device from said computer system.

37. The computer apparatus as claimed in claim 35 wherein said removal routine of said set-up utility program leaves said operating system patch after removal of said peripheral device from said computer system.

38. The computer apparatus as claimed in claim 25 wherein said welcome application comprises a back-up program and said back-up program copies information from a memory in said computer system to a nonvolatile storage system in said back-up peripheral.

39. The method as claimed in claim 38 wherein said nonvolatile storage system comprises flash memory.

40. A method of backing up a mobile computer system, said method comprising:
detecting the insertion of a small handheld back-up peripheral inserted into an expansion interface of said mobile computer system, said small handheld back-up peripheral comprising a back-up program and a nonvolatile storage system;
immediately executing said back-up program in response to detecting the insertion of said small handheld back-up peripheral into said expansion interface; and
copying information from a memory in said mobile computer system to said nonvolatile storage system in said small handheld back-up peripheral using said back-up program.

41. The method as claimed in claim 40 wherein said nonvolatile storage system comprises flash memory.

42. The method as claimed in claim 40, said method further comprising:
restoring information stored in said nonvolatile storage system back into said memory in said mobile computer system.

* * * * *